United States Patent [19]
Gartland, Jr. et al.

[11] 3,904,958

[45] Sept. 9, 1975

[54] CIRCUIT TESTER INCLUDING INFORMATION DISPLAY MEANS FOR TESTING ELECTRICAL OUTLET RECEPTACLES

[75] Inventors: Albert John Gartland, Jr., Trumbull; John Phillip Goodsell, Stratford; Ernest Gerhard Hoffman, Middlefield, all of Conn.

[73] Assignee: Harvey Hubbell, Incorporated, Bridgeport, Conn.

[22] Filed: July 17, 1974

[21] Appl. No.: 489,425

[52] U.S. Cl. ................ 324/51; 324/133; 340/255; 340/378 R
[51] Int. Cl.[2] ................ G01R 31/02; G01R 19/14
[58] Field of Search ........ 324/51, 66, 133; 340/251, 340/252, 255, 383, 378 R, 378 A, 381, 372; 339/113 L

[56] References Cited
UNITED STATES PATENTS

| | | | |
|---|---|---|---|
| 3,317,825 | 5/1967 | Huff | 324/66 X |
| 3,333,188 | 7/1967 | Eagle | 324/133 X |
| 3,383,588 | 5/1968 | Stoll et al. | 324/51 |
| 3,413,548 | 11/1968 | Schweitzer | 324/51 X |
| 3,559,200 | 1/1971 | Walters | 340/255 |
| 3,783,371 | 1/1974 | McMillan | 324/66 X |

*Primary Examiner*—Gerard R. Strecker

[57] ABSTRACT

A circuit tester for testing the electrical circuits associated with electrical sockets and receptacles includes a housing within which a plurality of indicator lamps are disposed and which are electrically connected to contact prongs of the tester whereby the same may be inserted within the particular socket or receptacle to be tested. Illuminable lenses are associated with the indicator lamps and a coded-information display means is rotatably and flexibly secured to the tester within a plane extending substantially at right angles to the longitudinal axis of the tester. In this manner, the display means may be readily consulted without removing the same from the tester, the rotatability and flexibility rendering the same totally adjustable to all positions.

12 Claims, 9 Drawing Figures

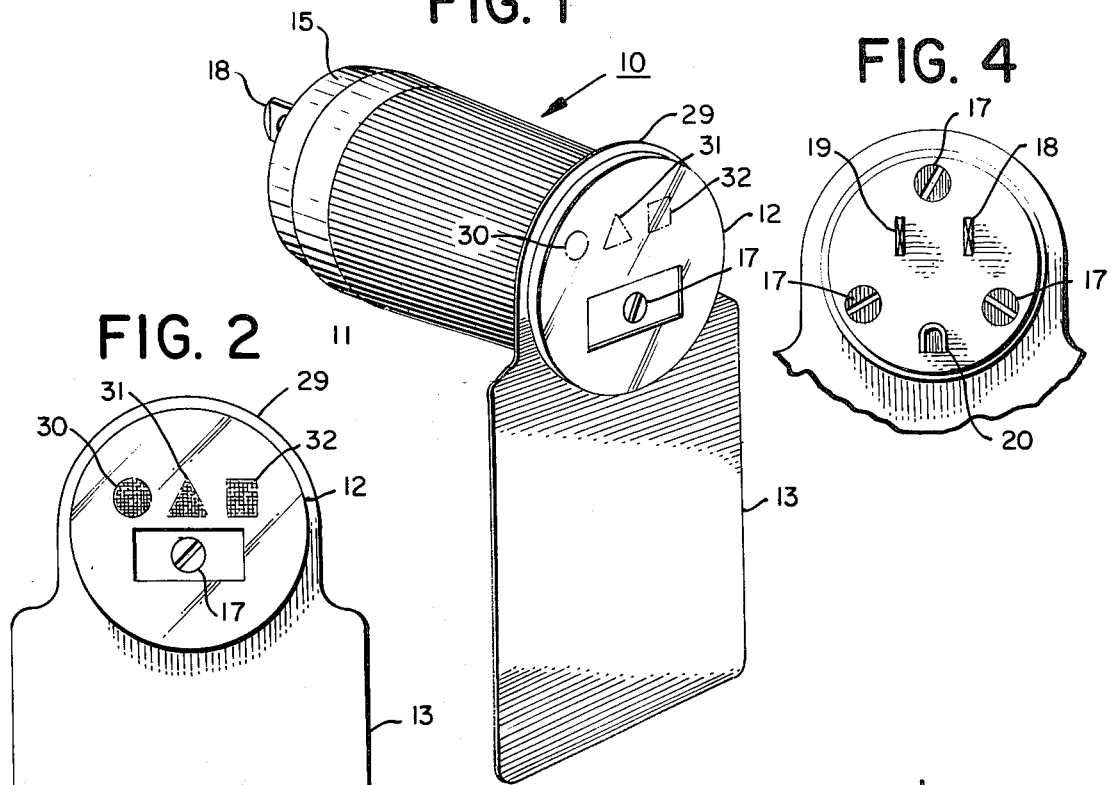
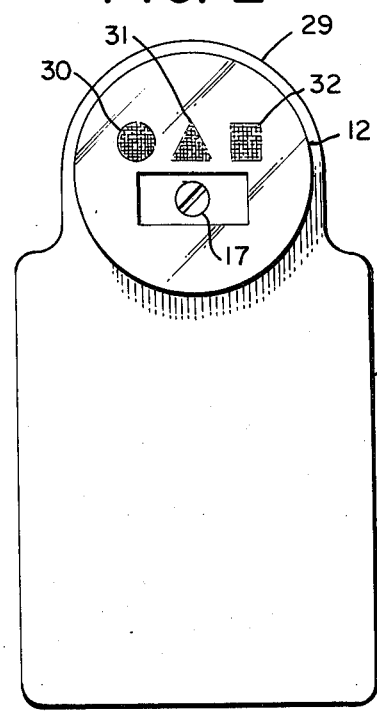
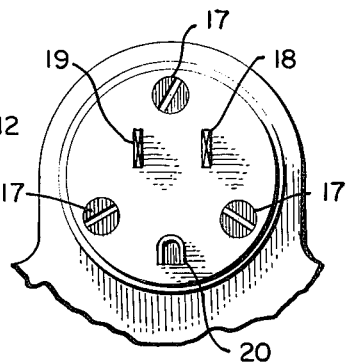
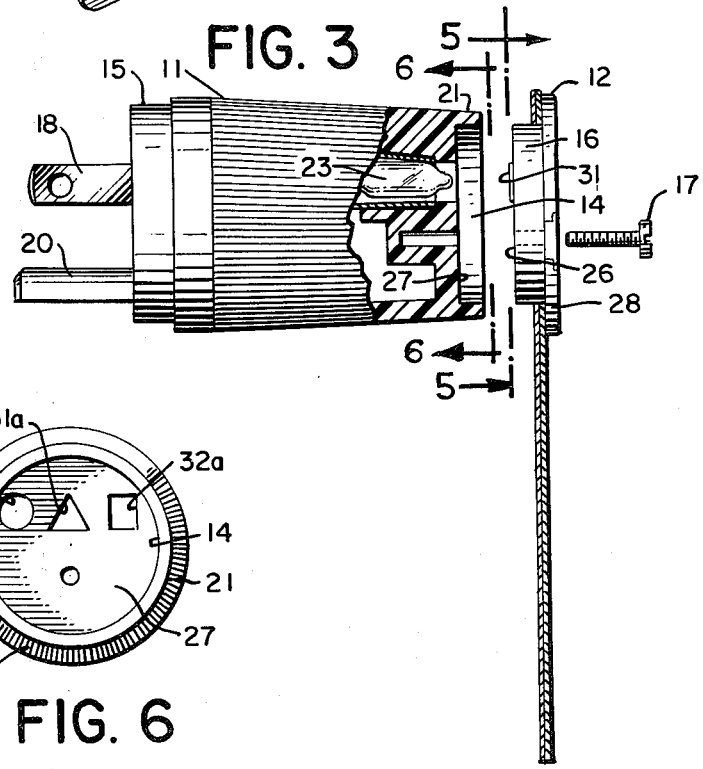
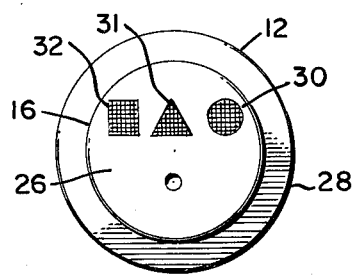
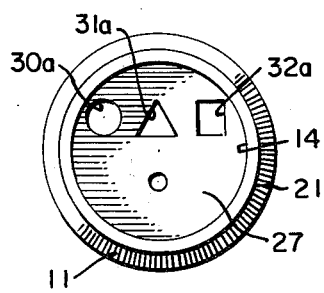

PATENTED SEP 9 1975                    3,904,958

CIRCUIT TESTER INCLUDING INFORMATION DISPLAY MEANS FOR TESTING ELECTRICAL OUTLET RECEPTACLES

BACKGROUND OF THE INVENTION

1. Field of the Invention:

The present invention relates generally to portable circuit testing devices and more particularly to portable circuit testers which provide interdistinguishable illuminated indications of the various conditions of the electrical circuits to which the tester is connected.

2. Description of the Prior Art:

Circuit testers of the general type herein under consideration are insertable within electrical receptacles and sockets for visually displaying, by means of the on and off states of illuminable indicating lamps, some of the more common conditions and defects within the circuitry which is associated with and terminates at the particular receptacle. These conditions, which are tabulated opposite correspondingly coded states of the lamps, are printed upon labels fixed to the side of the tester so that the user can compare the coded tabulation of the indicating lights to the particular corresponding circuit condition displayed or indicated by the lamps. The indicator lights are typically mounted upon the face or end of the device while the circuit condition chart tabulating the illuminated states of the lights is fixed to the side of the device. Hence, it is usually necessary for the operative to initially plug the circuit tester into the particular socket or receptacle to be tested, observe which ones of the indicator lights have been illuminated while the tester is within the receptacle, and then remember the indicated lamp pattern as the tester is unplugged so as to be able to consult the coded indicator chart disposed upon the side of the device before the condition of the circuit under test can be fully evaluated.

The charts of information are typically in tabulated form and as the list of possible circuit conditions increases in length it not only becomes more difficult to remember the particular pattern of the indicator lights, but it also becomes more difficult to provide a comprehensive listing of the various circuit conditions upon the relatively small body surface of the circuit tester. Prior art designs of these devices provide only enough space permitting the listing for only approximately ten wiring conditions and defects whereas there are many more combinations of conditions and defects which may be desirable to ascertain. Moreover, it is quite important that the listing of information be fixedly attached to the tester, otherwise the chart may become lost or misplaced and thereby render the circuit tester virtually useless.

SUMMARY OF THE INVENTION

Accordingly, it is an object of the present invention to provide a new and improved portable circuit tester for use in testing electrical circuits associated with electrical receptacles and outlets.

Another object of the present invention is to provide information-display means upon a small circuit testing device whereby the size of the display means is independent of the size of the device.

Still another object of the present invention is to provide information display means upon a small circuit testing device which is permanently attached to the device and yet may be moved relative thereto in order to facilitate comparison of the displayed information and the device symbols while the device remains in situ within the receptacle or socket.

Yet another object of the present invention is to provide a circuit tester of a relatively small size and an information tag which permits the circuit tester to be readily stored within an operative pocket, tool box or the like the tag being readily conformable to the storage place.

The foregoing objectives are achieved according to the present invention through the provision of a circuit tester wherein the printed matter forming the chart of information is made available to the operative by means of at least one permanently attached, flexible and rotatable information tag mounted at essentially right angles to the longitudinal axis of the tester body and hence is disposed within the same general plane as the face of the tester. The tester can thus be plugged into a receptacle or socket mounted at any particular orientation or location and the tags rotated so that the printed information can always be read by the operative right side up and horizontally from left to right.

Moreover, as the tags are both flexible and rotatable, the information can be read without the circuit tester being removed from the outlet being tested thereby eliminating a major potential source of error in evaluating the circuits which arises from the user trying to remember the exact states of the indicating lamps while consulting the chart of information. In addition, both sides of the tag may be printed with circuit information, the printing upon one side of the tag is oriented at 180° with respect to the printing upon the reverse side. This structure thereby permits the printing upon either side of the tag to be read by the user right side up and horizontally from left to right.

The information tags are permanently retained upon the testing device by interposing the tags between a flanged portion of an end member mounted upon the device and a shoulder portion of the device body, the tags also being mounted thereon by means of an interference fit so as to maintain the labels or tags in whatever position the user moves them to. It may moreover be appreciated that the use of the information tags constructed according to the present invention, as contrasted to labels wrapped upon or about the body of the circuit tester, allows the size of the tag to be independent of the size and configuration of the tester whereby considerably more information can be printed upon the tags than could otherwise be placed upon the body of the tester.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a perspective view of a circuit tester constructed in accordance with the present invention and showing its cooperative parts;

FIG. 2 is a front elevation of the circuit tester illustrated in FIG. 1;

FIG. 3 is a side elevation, partly in cross-section, of the circuit tester of FIG. 1, with the cover assembly removed from the tester body;

FIG. 4 is a rear elevation view of the tester of FIG. 1, with portions of the tag cut-away;

FIG. 5 is a cross-section view of the tester of FIG. 3 taken along line 5—5 of FIG. 3;

FIG. 6 is a cross-section view of the tester of FIG. 3 taken along line 6—6 of FIG. 3;

DETAILED DESCRIPTION OF A PREFERRED EMBODIMENT

Figure 9:
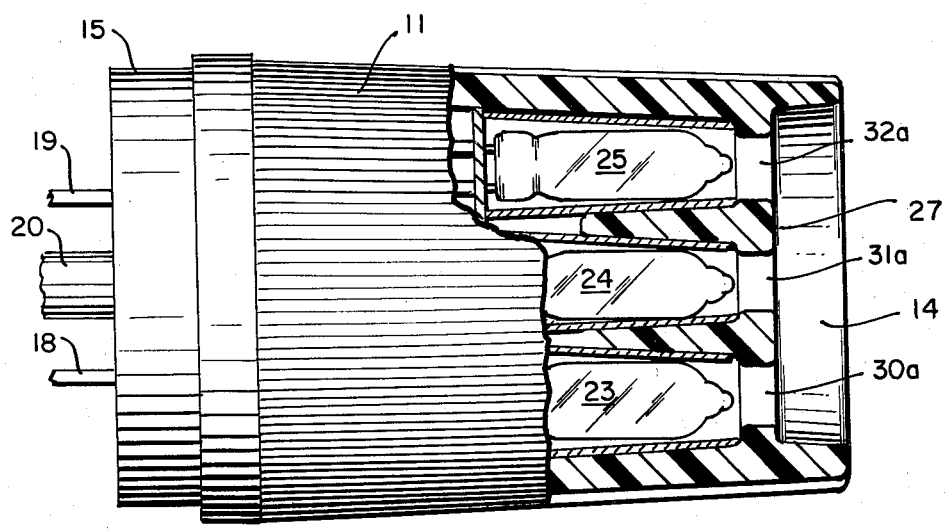
FIG. 9 is a plan view, partly in cross-section, of the tester illustrated in FIG. 3, the lens mounting having been removed.

Referring now to the drawings, there is shown a portable circuit tester assembly generally indicated by the reference character 10 and comprising a cylindrical housing member 11, a transparent cover 12 which is adapted to be mounted within the forward end portion of body member 11, an electrical contact carrier 15 which is adapted to be mounted within the rear portion of member 11, and a coded information-bearing tag 13 which is adapted to be interposed between housing member 11 and transparent cover 12 and thereby fixedly mounted upon circuit tester 10. As best seen in FIGS. 3 and 9, housing member 11 is somewhat tapered in the longitudinal direction thereof and the outer peripheral surface thereof may be longitudinally knurled so as to facilitate handling of the same. The right end or forward portion of member 11 is provided with a countersunk recess 14 within which a plug portion 16 of cover 12 is adapted to be seated, the diametrical extent of recess 14 being less than the diametrical extent of such end portion of member 11 whereby an annular shoulder 21 is defined thereby.

The axial extent of recess 14 is also seen to be less than the axial length of plug 16 and consequently, when cover 12, and more particularly plug 16 thereof, is inserted within recess 14, the interior face 26 of plug 16 will abut an opaque mask end wall 27 defining recess 14 and an annular gap, not shown, will thereby be defined between shoulder 21 of member 11 and an annular flanged portion 28 of cover 12 whereby the ring member 29 of tag 13 will be rotatably disposed about plug 16 and within the gap, not shown, the coded tag thus being suspended from the assembly 10 within a vertical plane. One or more suitable fasteners 17 may of course be utilized to fixedly mount cover 12 to member 11 and thereby permanently retain the tag 13 upon the assembly 10. With respect to the particular materials from which housing 11 and transparent cover 12 may be fabricated, the housing may be made of any one of various materials, such as for example, nylon, while the cover may be made of any one of various rigid, transparent materials, such as for example, polyvinylchloride (PVC).

Referring again to FIGS. 3 and 9, three indicator lamps 23, 24, and 25 are suitably supported, by means not shown, within housing 11 in an equidistant, planar array, and correspondingly therewith, in an opposed relation thereto, three, discrete, serrated areas 30, 31 and 32 are provided within cover 12 so as to diffuse concentrated light rays received from differently encoded apertures 30a, 31a, and 32a provided within opaque mask 27. The illuminated areas 30–32 as well as the apertures 30a–32a may have different geometrical configurations, such as for example, that of a circle, triangle, or square as shown in the drawings, or alternatively, or concomitantly, areas 30–32 or lamps 23–25 may be of various colors, both modes serving to more readily identify the particular area or areas which have been illuminated by means of the lamps 23–25. As more particularly seen in FIG. 3, the areas 30–32, as exemplified by area 31 within the Figure, project axially inwardly so as to seat within apertures 30a–32a and thereby positively position the areas within the apertures, respectively.

Surrounding each lamp 23–25 is a colimeter which has the configuration of a cylindrical or tubular sleeve, not numbered, the interior of which is light reflective whereby the light rays emanating from lamps 23–25 will be concentrated so as to pass through the apertures 30a–32a within mask 27 and illuminate areas 30–32. The innermost ends of sleeves are mounted against a flat insulating board, also not numbered but best seen within FIG. 9, within which the terminals from the contacts 18–20 as well as from lamps 23–25 are inserted. It should also be noted that the lamps 23–25 and areas 30–32 are in fact disposed within a planar or linear array in order to enhance the positional discrimination between the areas as the central area always serves as an immediate point of reference with respect to which the overall light pattern may readily be ascertained. This is especially important because as the angular position or orientation of the device is altered from one test to another depending upon the particular disposition of the socket or receptacle to be tested, the point of reference is not readily lost or rendered difficult to obtain as is the case with conventional tester devices which employ a symmetrical, equilateral triangular lens array or pattern.

The contact carrier 15 has disposed therein three prong-type contacts 18, 19, and 20 whereby the entire contact assembly resembles a conventional three-prong plug, the contacts 18 and 19 serving as the hot and neutral terminal contacts while contact 20 serves as the ground contact. Carrier 15 may of course be secured within housing 11 by means of suitable fasteners 17 and in a manner similar to that of cover 12.

In using the circuit tester of the present invention in order to verify the wiring within a particular receptacle, the assembly 10 is merely inserted within the receptacle through means of contacts 18–20, and depending upon the wiring mode within the receptacle, one or more of the indicator lamps 23–25, and the areas 30–32 illuminated thereby, will or will not be energized. The operative may then conveniently consult the tag 13 which is dependently supported within a vertical plane from assembly 10 and upon which has been encoded the various pertinent circuit wiring information. As best seen for example in FIG. 7, such information includes a plurality of geometrically configured, colored arrays which respectively correspond to the areas 30–32 within cover 12 and disposed opposite the colored arrays upon tag 13 there is respectively tabulated the particular wiring mode characteristic of the tested receptacle which may for example indicate whether or not the receptacle is properly wired, whether the receptacle exhibits reversed polarity, whether there is an open ground connection, and open neutral connection, or an open hot connection, whether the hot and ground connections are reversed, whether the hot wire is connected to the neutral terminal and therefore the hot terminal is not wired, or other similar wiring defects desired to be detected.

With respect to the particular material from which tag 13 may be fabricated it is desired that the same be flexible and resilient and consequently the tag may be formed of any one of various materials exhibiting such properties, one example of which is laminated thermoplastic polyester (Mylar). As was noted hereinbefore, tag 13 is interfitted between shoulder 21 of housing 11 and annular flange 28 of cover 12 by means of ring portion 29. Due to the particular materials from which housing 11, tag 13, and cover 12 may be formulated, in addition to the fact that the thickness of ring portion 29 of tag 13 is approximately the same as the gap, not shown, defined between the shoulder 21 and flanged portion 28, tag 13 is in fact disposed between housing 11 and cover 12 and about plug portion 16 of cover 12 by means of a friction fit. In this manner, the tag 13 may be rotatably positioned about plug 16 to any desired angular orientation in order to facilitate reading of the same by the operative when verifying the particular wiring characteristics of the receptacle being tested.

Figure 7:
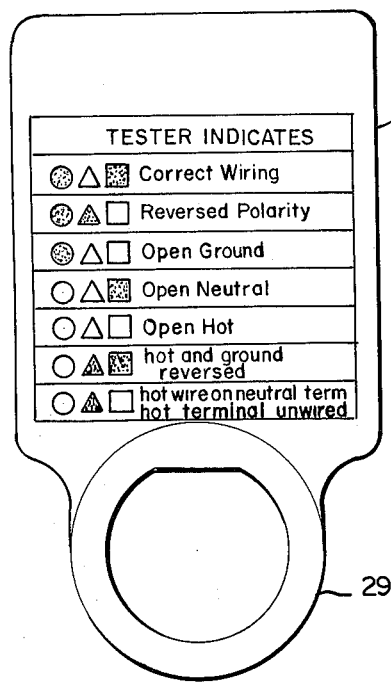
FIG. 7 is a plan view of a typical information-bearing tag which may be mounted upon the tester of the present invention.
Figure 8:
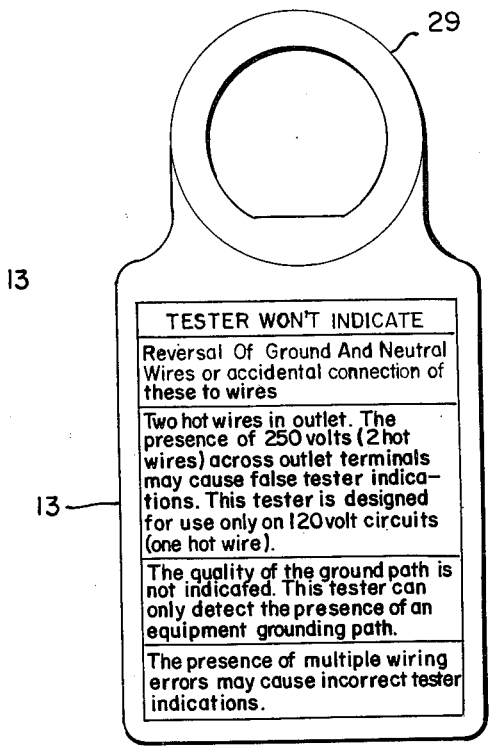
FIG. 8 is a plan view of the reverse side of the tag illustrated in FIG. 7.

As is further illustrated within FIG. 8, the reverse side of tag 13 may contain additional information pertinent to the wiring characteristics of the receptacle, the printing thereon being reversed 180° with respect to the printing appearing upon the front side of tag 13 as seen in FIG. 7. In this manner, due to the fact that the tag is rotatably mounted upon the assembly and due to the additional fact that the tag is flexible, the tag may be suitably rotated and flexed whereby the information appearing upon either side of the tag may be readily available to the operative in effectively testing the particular receptacle.

Thus, it may be seen that the circuit tester of the present invention has important advantages over the known prior art structures in that the tester of the present invention has the coded, wiring information printed upon a tag which is permanently, yet rotatably and flexibly secured to the tester assembly whereby the operative may conveniently consult the same without having to remove the tester assembly from the receptacle being tested and thereby run the risk of reaching erroneous wiring conclusions. In addition, due to the noted rotatability and flexibility, both sides of the tag may contain pertinent wiring information which may be conveniently utilized by the operative, and still further, as the tag is dependently supported from the tester assembly, the size of the tag is independent of the tester housing and consequently, a substantially greater amount of information may be imprinted thereon.

It is to be noted that the particular circuitry interconnecting the tester contacts and the indicator lamps, whereby the particular lamps will or will not be illuminated as a result of particular wiring defects within the receptacle being tested, is deemed conventional and moreover does not constitute a part of the present invention, and consequently a detailed description of such circuitry has been omitted herefrom.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A circuit tester for testing electrical circuits within receptacles and sockets, comprising:
    a housing;
    electrical contact means secured within one end of said housing for facilitating insertion of said tester within said receptacles to be tested;
    a plurality of indicator lamps disposed within said housing and adapted to be electrically connected with said electrical contact means whereby one or more of said lamps will or will not be illuminated in response to the propriety of the wiring of said circuits within said receptacles;
    a cover secured within the other end of said housing opposite said end within which said contact means are secured and having a plurality of areas which are adapted to be illuminated by said indicator lamps; and
    information display means, having wiring characteristics of the electrical circuit under test displayed thereon, connected to said other end of said housing and disposed in a side-by-side and substantially co-planar relationship with said cover and said plurality of areas to be illuminated whereby comparison of an illuminated area pattern with a correspondingly displayed wiring characteristic of said electrical circuit being tested is facilitated.

2. The circuit tester as set forth in claim 1 wherein: said information display means is interposed between said cover and said other end of said housing.

3. The circuit tester as set forth in claim 2 wherein: said information display means includes a supporting ring member rotatably secured upon said cover by means of a friction or interference fitting, whereby said information display means may be rotated to and retained within a particular angular portion.

4. The circuit tester as set forth in claim 3 wherein: said information display means further includes a flexible planar tag integrally formed with said ring member, whereby said information means may be rotated and flexed to a plurality of positions for facilitating reading of said information disposed thereon.

5. The circuit tester as set forth in claim 4, wherein said tag is made of a laminated thermoplastic polyester.

6. The circuit tester as set forth in claim 4 wherein: said tag includes two surfaces upon which said information may be disposed, whereby due to said flexibility and rotatability, said information appearing upon either of said two surfaces of said tag may be made readily accessible to an operative.

7. The circuit tester as set forth in claim 1, wherein: said information display is disposed within a plane which is perpendicular to the longitudinal axis of said housing and parallel to the end surface of said other end of said housing within which said cover is secured, whereby said comparison of said illuminated area pattern and said correspondingly listed characteristic of said circuit is facilitated.

8. The circuit tester as set forth in claim 1, wherein: said areas have different geometrical configurations, whereby said illuminated pattern may be readily distinguished.

9. The circuit tester as set forth in claim 1, wherein:
said areas differ in color from one another,
whereby said illuminated pattern may be readily distinguished.

10. The circuit tester as set forth in claim 1 wherein said housing is formed of nylon.

11. The circuit tester as set forth in claim 1, wherein: said lamps differ in color from one another,
whereby said illuminated pattern may be readily distinguished.

12. The circuit tester as set forth in claim 1, wherein:
said areas are disposed in a linear array,
whereby said illuminated pattern may be readily distinguished.

* * * * *